US012702959B2

(12) United States Patent
Literski

(10) Patent No.: US 12,702,959 B2
(45) Date of Patent: Aug. 11, 2026

(54) DILUTION WALL

(71) Applicant: Ecochem Australia Pty Ltd, Upper Plenty (AU)

(72) Inventor: Geoffrey Grant Literski, Upper Plenty (AU)

(73) Assignee: ECOCHEM AUSTRALIA PTY LTD, Upper Plenty (AU)

( * ) Notice: Subject to any disclaimer, the term of this patent is extended or adjusted under 35 U.S.C. 154(b) by 115 days.

(21) Appl. No.: 18/608,063

(22) Filed: Mar. 18, 2024

(65) Prior Publication Data

US 2025/0288963 A1 Sep. 18, 2025

(51) Int. Cl.
*B01F 23/40* (2022.01)
*B01F 101/24* (2022.01)

(52) U.S. Cl.
CPC ........... *B01F 23/483* (2022.01); *B01F 23/49* (2022.01); *B01F 2101/24* (2022.01)

(58) Field of Classification Search
CPC .... B01F 23/483; B01F 23/49; B01F 2101/24; B01F 25/312; B01F 33/813; B01F 23/451
See application file for complete search history.

(56) References Cited

U.S. PATENT DOCUMENTS 7,516,763 B2 * 4/2009 Bertucci .................. B67D 7/02 222/144.5
2005/0150572 A1 * 7/2005 Beldham ............ A47G 19/2205 141/180
2007/0034644 A1 * 2/2007 Bertucci ................ B67D 7/741 141/351
2012/0279912 A1 * 11/2012 McCurdy .............. B01F 23/451 285/361

* cited by examiner

*Primary Examiner* — Jason K Niesz
(74) *Attorney, Agent, or Firm* — Whitmyer IP Group LLC

(57) ABSTRACT

A cleaning solution dilution system is provided for a paper-board converting plant. The system includes a panel that is provided with at least one of: a transport aid to move the system into a paper board converting plant, a mounting aid to hang the system on a wall of the paper board converting plant, or an installation aid having instructions printed directly on the panel. The system also includes at least two mixing apparatus, wherein each of the mixing apparatus includes an inlet for a cleaning solution, an inlet for other fluid, and an outlet for a mixture of the cleaning solution and other fluid. The system includes a plurality of isolation valves, a plurality of one-way valves, and a pressure-limiting valve. If provided, the instructions on the panel direct a user where to assemble the other components.

7 Claims, 4 Drawing Sheets

DILUTION WALL

TECHNICAL FIELD

This application relates to paperboard converting plants. More particularly, aspects of this application relate to systems for mixing and diluting cleaning chemicals to be used in paperboard converting plants.

BACKGROUND

In the operation of a paperboard converting plant, tens of thousands of feet of paperboard move through converting equipment on a daily basis. As the paperboard touches feed rollers within the converting equipment, starch rubs from the paperboard onto the feed rollers. Also, as the anilox rolls apply ink to the paperboard, traces of ink remain on the anilox rolls. The residues of ink and starch can detract from efficient operation by smearing or by causing slippage. Accordingly, it is desirable to clean the rollers from time to time.

Rollers can be cleaned by spraying them with soap or other cleaning chemicals. Typically, soap is delivered to a paperboard converting plant in totes of concentrated soap. The concentrated soap then is diluted to its working strength. Often, dilution is a manual operation that involves galoshes, other personal protective equipment, and a hand-held hose.

SUMMARY

This application discloses a cleaning solution dilution system for a paperboard converting plant. The system includes a panel that is provided with at least one of: a transport aid to move the system into a paper board converting plant, a mounting aid to hang the system on a wall of the paper board converting plant, or an installation aid having instructions printed directly on the panel. The system also includes at least two mixing apparatus, wherein each of the mixing apparatus includes an inlet for a cleaning solution, an inlet for other fluid, and an outlet for a mixture of the cleaning solution and other fluid. The system includes a plurality of isolation valves, a plurality of one-way valves, and a pressure-limiting valve.

DETAILED DESCRIPTION

Figure 1:
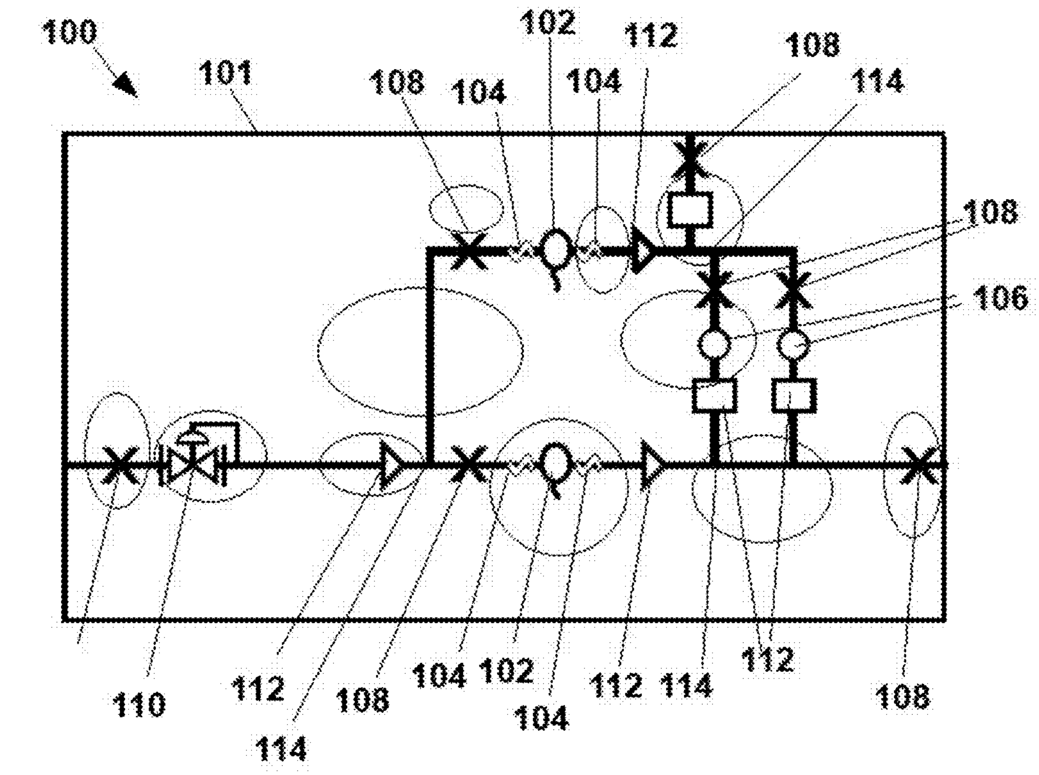
FIG. 1 depicts an example of a heated cleaning solution dilution system 100, according to an aspect of the disclosure.
Figure 3:
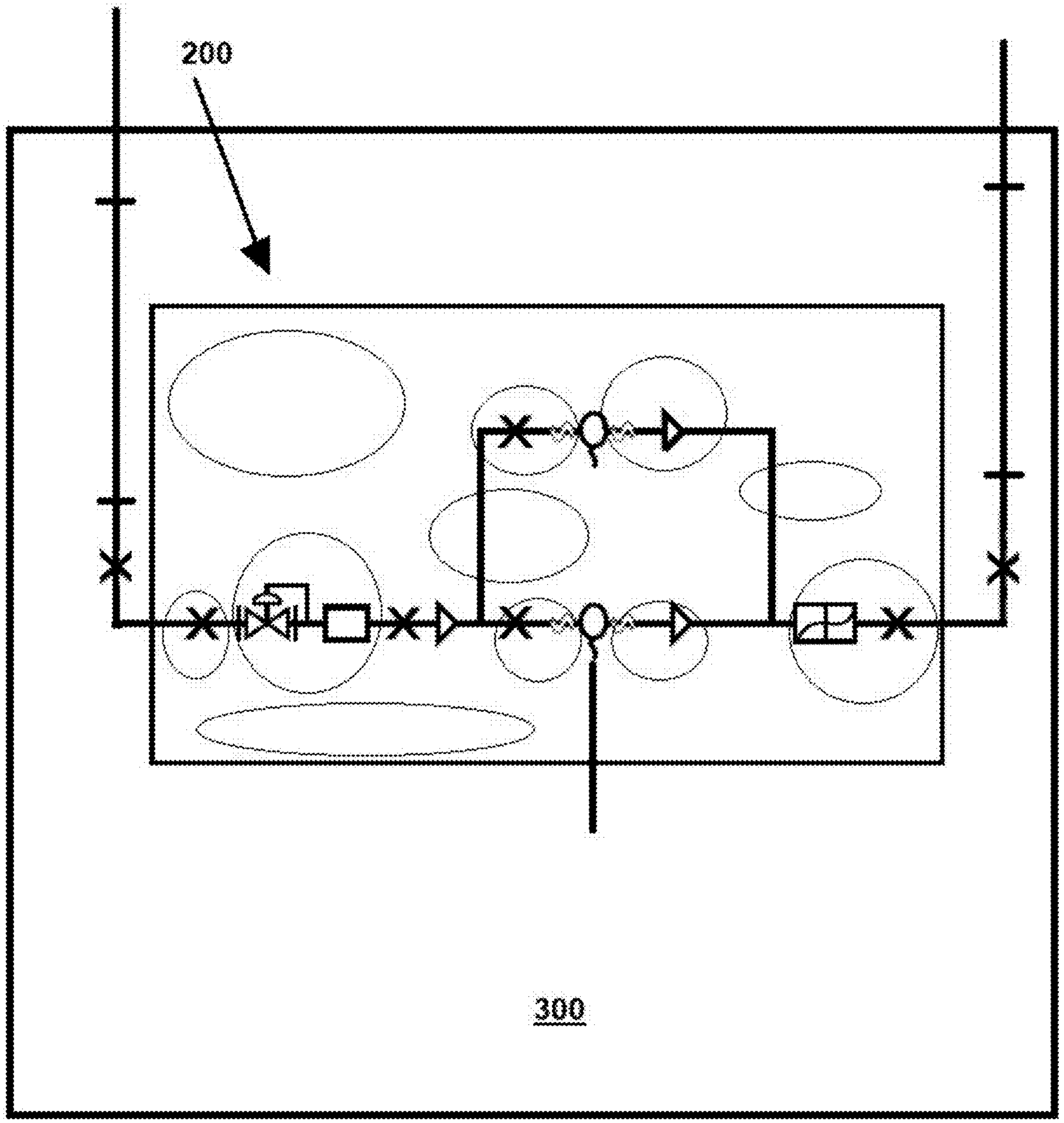
FIG. 3 depicts a cleaning solution dilution system 200 that is installed in a paperboard converting plant 300, according to an aspect of the disclosure.

FIG. 1 depicts an example of a heated cleaning solution dilution system 100, according to an aspect of the disclosure. The system 100 is mounted on a printed placard or panel 101, which provides labels that direct where the other components are to be assembled. Among various modes of delivering the system 100 to a user, some options include:

a. delivering the system 100 fully assembled on a roller stand (transport aid, not shown);

b. delivering the system 100 fully assembled with brackets to mount the placard to a wall of a paperboard converting plant, as shown in FIG. 3; or c. delivering the system 100 as one or more boxes of components with the printed placard as an installation aid for the user to assemble the components onto the panel.

The system 100 also includes first and second cleaning solution mixer apparatus 102, which are connected to the rest of the system by anti-hammer flexible hoses 104. Because heating the cleaning solution requires pushing the cleaning solution through heat exchangers, which present flow resistance, the system 100 also includes first and second circulation pumps 106 for that purpose.

Duplicated ("first and second") components are a theme of the system 100 (and of the system 200, further described below with reference to FIG. 2). Duplicated components make it possible to keep the system in operation while repairing or replacing a worn or damaged component. Shut off valves 108 also enable isolating a component in one part of the system for repair or replacement while maintaining flow through another part of the system.

The system 100 may receive water at any range of pressures, although a minimum pressure of about 40 psi is preferred. To regulate the pressure of water in the system, a pressure valve 110 is provided at the water inlet. In some embodiments, the pressure valve 110 regulates the water supply to about 40 psi.

Because it is preferable to prevent cleaning solution backflowing into the water supply, a non-return valve 112 is provided immediately downstream from the pressure valve. Similar non-return valves 112 also are provided downstream from the circulation pumps 106.

T-joints 114 provide for parallel duplicate flow paths so that a portion of the system may be isolated for service while maintaining operation of the overall system.

As can be seen from FIG. 1, the panel or placard 101 is marked with labels that instruct a user where to attach the other components of the system 100.

Figure 2:
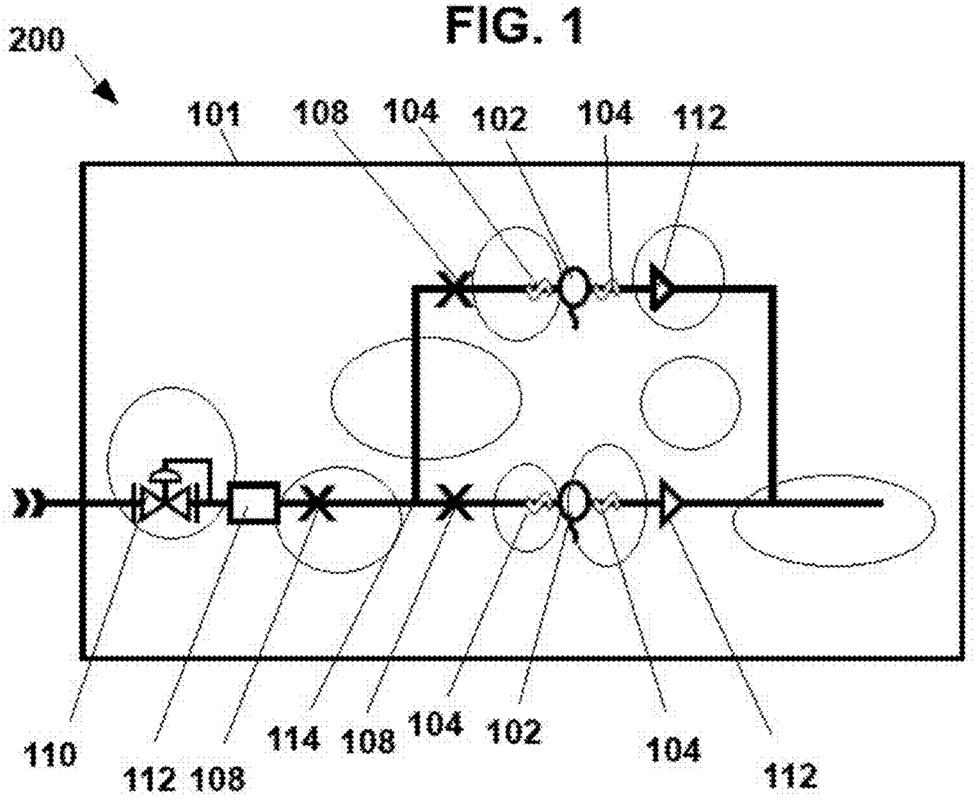
FIG. 2 depicts an example of an unheated cleaning solution dilution system 200, according to an aspect of the disclosure.

FIG. 2 depicts an example of an unheated cleaning solution dilution system 200, according to an aspect of the disclosure. Because the unheated system 200 does not require pushing diluted solution through heat exchangers, the circulation pumps 106 and their non-return valves 112 may be omitted from the unheated system.

FIG. 3 depicts an example of an unheated cleaning solution dilution system 200 that is installed in a paperboard converting plant 300, according to an aspect of the disclosure. By providing the entire system on a single panel 101, the system can readily be installed (e.g., attached to a wall of the plant) for use.

Figure 4:
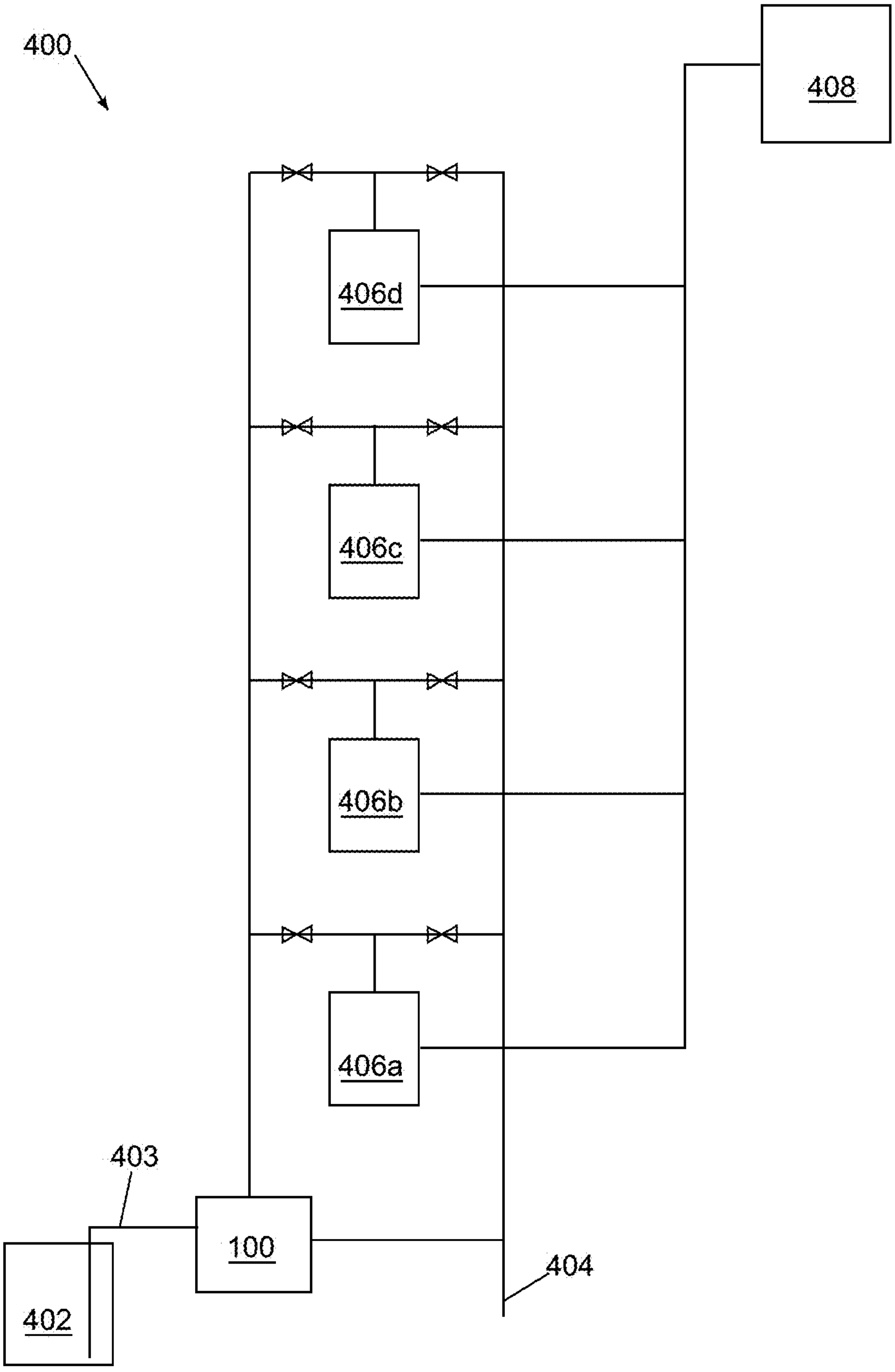
FIG. 4 depicts a schematic of a paperboard converting plant 400 that incorporates a cleaning solution dilution system 100, according to an aspect of the disclosure.

FIG. 4 depicts a schematic of a paperboard converting plant 400 that incorporates a cleaning solution dilution system 100, according to an aspect of the disclosure. The system 100 receives pressurized water from a supply line 404, and its mixer apparatus 102 use the pressurized water to suck in and dilute cleaning solution from a tote or other reservoir 402 via a suction line or hose 403. The system 100 then delivers the diluted cleaning solution to one or more of the paperboard converters 406*a*, 406*b*, 406*c*, 406*d*. From the converters, waste cleaning solution goes to a sump 408. The general arrangement of a paperboard converting plant will be familiar to a skilled worker.

Figure 5:
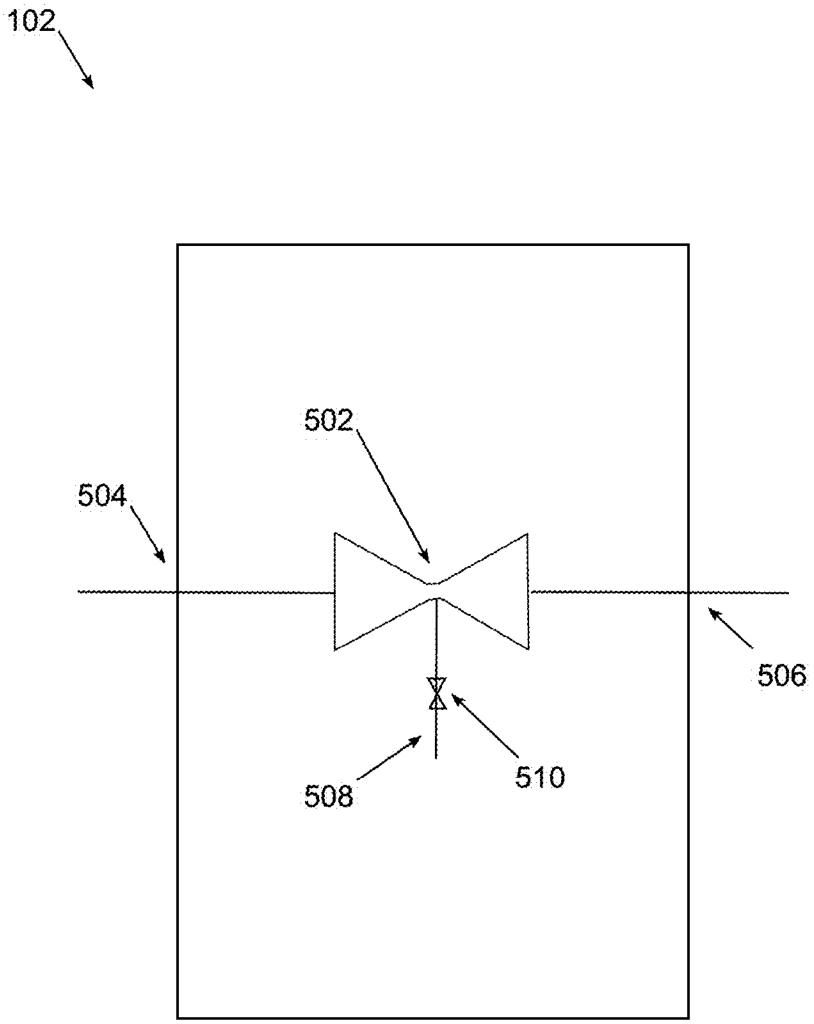
FIG. 5 depicts an example of a cleaning solution mixer apparatus 102, according to an aspect of the disclosure.

FIG. 5 depicts an example of a cleaning solution mixer apparatus 102, according to an aspect of the disclosure. The apparatus 102 includes a venturi nozzle 502. The venturi nozzle 502 receives pressurized water from a water inlet 504, sucks in cleaning solution from a cleaning solution inlet 508 through a proportioning valve 510, and discharges the mixture of diluted cleaning solution to an outlet 506. The proportioning valve 510 can be throttled to adjust the fraction of cleaning solution that is mixed with the water.

What is claimed is:

1. A cleaning solution dilution system for a paperboard converting plant, the system comprising:

a panel that is provided with at least one of: a transport aid to move the system into a paper board converting plant, a mounting aid to hang the system on a wall of the paper board converting plant, or an installation aid having instructions printed directly on the panel;

a fluid inlet for receiving a fluid for a fluid source, the fluid inlet having a pressure limiting valve for regulating the pressure of the fluid entering the cleaning solution dilution system;

a first fluid path mounted to a surface of the panel for selectively receiving the fluid from the fluid inlet, the first fluid path comprising a mixing apparatus including an inlet for a cleaning solution, an inlet for the fluid, and an outlet for a mixture of the cleaning solution and the fluid;

at least one second fluid path mounted to the surface of the panel for selectively receiving the fluid from the fluid inlet, the at least one second fluid path being a duplicate of the first fluid path and comprises a mixing apparatus, the mixing apparatus including an inlet for a cleaning solution, an inlet for the fluid, and an outlet for a mixture of the cleaning solution and the fluid;

wherein, the first fluid path and the at least one second fluid path are arranged in parallel and each of the first fluid path and the at least one second fluid path have at least one isolation valve and at least one one-way valve provided therein;

wherein the at least one isolation valve and the at least one one-way valve are controlled such that one of the first fluid path or the at least one second fluid path can be isolated from the fluid whilst the fluid is connected to another of the first fluid path or the at least one second fluid path.

2. The system of claim 1, wherein the first fluid path and the at least one second fluid path further comprise at least one anti-hammer hose.

3. The system of claim 1, wherein the mixing apparatus of the first fluid path and the at least one second fluid path includes a proportioning structure for adjusting a ratio of the cleaning solution to the fluid in the mixture.

4. The system of claim 1, wherein the mixing apparatus of the first fluid path and the at least one second fluid path includes a venturi nozzle for establishing suction at the inlet for the cleaning solution in response to a flow of fluid from the fluid inlet to its outlet.

5. The system of claim 1, wherein the first fluid path and the at least one second fluid path further comprise at least one circulation pump.

6. The system of claim 1, wherein the instructions direct an installer to assemble the system.

7. A paperboard converter cleaning solution dilution apparatus comprising:

a kit that is provided with at least one of: a transport aid to move the kit into a paper board converting plant, a mounting aid to hang the kit on a wall of the paper board converting plant, or an installation aid having instructions printed directly on the kit;

at least two mixing apparatus, wherein each of the mixing apparatus includes an inlet for a cleaning solution, an inlet for other fluid, and an outlet for a mixture of the cleaning solution and other fluid;

a pressure-limiting valve;

a first one-way valve that is connected in fluid communication downstream from the pressure-limiting valve;

a first tee connection that is connected in fluid communication downstream from the first one-way valve;

a first anti-hammer hose that is connected in fluid communication downstream from a first branch of the first tee connection, the first anti-hammer hose being connected in fluid communication to the other fluid inlet of one of the mixing apparatus; and a second anti-hammer hose that is connected in fluid communication downstream from a second branch of the first tee connection, the second anti-hammer hose being connected in fluid communication to the other fluid inlet of another of the mixing apparatus.

* * * * *